United States Patent
Muir et al.

(10) Patent No.: US 11,113,570 B2
(45) Date of Patent: Sep. 7, 2021

(54) SYSTEMS AND METHODS FOR AUTOMATICALLY GENERATING TRAINING IMAGE SETS FOR AN ENVIRONMENT

(71) Applicant: THE BOEING COMPANY, Chicago, IL (US)

(72) Inventors: Eric Raymond Muir, Bothell, WA (US); Nick Shadbeh Evans, Lynnwood, WA (US); Joshua David Kalin, Owens Cross Roads, AL (US)

(73) Assignee: THE BOEING COMPANY, Chicago, IL (US)

( * ) Notice: Subject to any disclaimer, the term of this patent is extended or adjusted under 35 U.S.C. 154(b) by 134 days.

(21) Appl. No.: 16/571,555

(22) Filed: Sep. 16, 2019

(65) Prior Publication Data
US 2021/0081711 A1     Mar. 18, 2021

(51) Int. Cl.
*G06K 9/62* (2006.01)
*G06T 7/11* (2017.01)
(Continued)

(52) U.S. Cl.
CPC ......... *G06K 9/6256* (2013.01); *G06K 9/0063* (2013.01); *G06K 9/3233* (2013.01);
(Continued)

(58) Field of Classification Search
CPC .. G06K 9/6256; G06K 9/3233; G06K 9/0063; G06T 7/11; G06T 2210/12; G06N 20/00
See application file for complete search history.

(56) References Cited

U.S. PATENT DOCUMENTS 6,400,831 B2   6/2002  Lee et al.
7,043,094 B2   5/2006  Thomas et al.
(Continued)

FOREIGN PATENT DOCUMENTS

WO     2018009405 A1    1/2018
WO     2018218707 A1   12/2018

OTHER PUBLICATIONS

US 10,001,775 B2, 06/2018, Levinson et al. (withdrawn)
(Continued)

*Primary Examiner* — Edward F Urban
*Assistant Examiner* — Wassim Mahrouka
(74) *Attorney, Agent, or Firm* — Armstrong Teasdale LLP

(57) ABSTRACT

A computer-implemented method for generating a training set of images and labels for a native environment includes receiving physical coordinate sets, retrieving environmental model data corresponding to a georeferenced model of the environment, and creating a plurality of two-dimensional (2-D) rendered images each corresponding to a view from one of the physical coordinate sets. The 2-D rendered images include one or more of the environmental features. The method also includes generating linking data associating each of the 2-D rendered images with (i) labels for the one or more included environmental features and (ii) a corresponding native image. Additionally, the method includes storing the training set including the 2-D rendered images, labels, corresponding native images, and linking data.

20 Claims, 10 Drawing Sheets

(51) Int. Cl.
    *G06N 20/00*    (2019.01)
    *G06K 9/00*    (2006.01)
    *G06K 9/32*    (2006.01)

(52) U.S. Cl.
    CPC ............... *G06N 20/00* (2019.01); *G06T 7/11* (2017.01); *G06T 2210/12* (2013.01)

(56) References Cited

U.S. PATENT DOCUMENTS

| | | | |
|---|---|---|---|
| 8,111,923 B2 | 2/2012 | Csurka et al. | |
| 9,613,149 B2 | 4/2017 | Spivack et al. | |
| 9,792,821 B1 | 10/2017 | Yalla et al. | |
| 9,838,744 B2 | 12/2017 | Moehrle | |
| 9,916,538 B2 | 3/2018 | Zadeh et al. | |
| 10,048,683 B2 | 8/2018 | Levinson et al. | |
| 10,089,742 B1 | 10/2018 | Lin et al. | |
| 10,192,117 B2 | 1/2019 | Loui et al. | |
| 10,198,846 B2 | 2/2019 | Carr | |
| 10,235,605 B2 | 3/2019 | Criminisi et al. | |
| 2015/0138310 A1 | 5/2015 | Fan et al. | |
| 2017/0123419 A1 | 5/2017 | Levinson et al. | |
| 2017/0193340 A1 | 7/2017 | Shtok et al. | |
| 2017/0255829 A1 | 9/2017 | Chang et al. | |
| 2017/0364733 A1* | 12/2017 | Estrada | G06N 3/0454 |
| 2018/0025749 A1 | 1/2018 | Oh et al. | |
| 2018/0365835 A1 | 12/2018 | Yan et al. | |
| 2019/0026958 A1* | 1/2019 | Gausebeck | G06T 19/20 |
| 2019/0080431 A1* | 3/2019 | Choi | G06T 5/50 |

OTHER PUBLICATIONS

Tylecek, Radim et al., Consistent Semantic Annotation of Outdoor Datasets via 2D/3D Label Transfer, Sensors, Jul. 12, 2019, vol. 18, No. 2249, pp. 1-20.

Sun, Baochen et al., Generating Large Scale Image Datasets from 3D CAD Models, Jan. 2, 2015, https://ai.bu/edu/pubs/cvpr2015_Workshop_virtual-dataset.pdf, pp. 1-3.

European Extended Search Report regarding European Patent Application No. 20178564.9 dated Nov. 30, 2020, pp. 1-9.

"Can one use computer simulation generated data for machine learning algorithms?", (Holzner, Andre) Sep. 20, 2007, (Kadous, Waleed) Sep. 23, 2007, Quora classification: machine learning and algorithms, retrieved on Aug. 15, 2019, Retrieved from Quora using Internet <URL: https://www.quora.com/Can-one-use-computer-simulation-generated-data-for-machine-learning-algorithms >.

* cited by examiner

| index | Filename | Type | Lat | Long | Alt | Heading | Time | Elapsed | Detected_sign | Dist_to_sign |
|---|---|---|---|---|---|---|---|---|---|---|
| 1 | C:\Users\T010343_0_1.png | RGB | 7.19708419 | 19.3322444 | 5280 | -35.6879 | 23066.66667 | 00:23.1 | Runway sign (3) | 54.15354 |
| 1 | C:\Users\T010343_1_1.png | RGB | 7.19708549 | 19.3322416 | 5280 | -35.72681 | 23100 | 00:23.1 | Runway sign (3) | 53.95957 |
| 1 | C:\Users\T010343_2_1.png | RGB | 7.19708549 | 19.3322416 | 5280 | -35.72681 | 23100 | 00:23.1 | Runway sign (3) | 53.95957 |
| 1 | C:\Users\T010343_3_1.png | RGB | 7.19708615 | 19.3322402 | 5280 | -35.74609 | 23133.33333 | 00:23.1 | Runway sign (3) | 53.86272 |
| 1 | C:\Users\T010343_4_1.png | RGB | 7.19708615 | 19.3322402 | 5280 | -35.74609 | 23133.33333 | 00:23.1 | Runway sign (3) | 53.86272 |
| 1 | C:\Users\T010343_5_1.png | RGB | 7.19708681 | 19.3322388 | 5280 | -35.76912 | 23166.66667 | 00:23.2 | Runway sign (3) | 53.76584 |
| 1 | C:\Users\T010343_6_1.png | RGB | 7.19708877 | 19.3322346 | 5280 | -35.82986 | 23200 | 00:23.2 | Runway sign (3) | 53.47605 |
| 1 | C:\Users\T010343_7_1.png | RGB | 7.19708877 | 19.3322346 | 5280 | -35.82986 | 23200 | 00:23.2 | Runway sign (3) | 53.47605 |
| 1 | C:\Users\T010343_8_1.png | RGB | 7.19708943 | 19.3322332 | 5280 | -35.84857 | 23233.33333 | 00:23.2 | Runway sign (3) | 53.38031 |
| 1 | C:\Users\T010343_9_1.png | RGB | 7.19708943 | 19.3322332 | 5280 | -35.84857 | 23233.33333 | 00:23.2 | Runway sign (3) | 53.38031 |

FIG. 4

SYSTEMS AND METHODS FOR AUTOMATICALLY GENERATING TRAINING IMAGE SETS FOR AN ENVIRONMENT

FIELD

The field of the disclosure relates generally to training image sets for use in training machine vision systems to navigate an environment, and more particularly to automatically generating such training image sets.

BACKGROUND

At least some known machine vision systems are trained to navigate an environment detected by image sensors (e.g., detected by cameras mounted on the machine). For example, at least some known unmanned aerial vehicles ("UAVs") utilize machine vision systems trained to autonomously navigate environments relevant to various mission objectives of the UAV. For another example, at least some known self-driving automotive vehicles utilize machine vision systems trained to navigate an environment relevant to autonomous driving and/or autonomous pursuit of various objectives of the self-driving vehicle. Such machine vision systems are typically trained using suitable machine learning algorithms as applied to a set of training images.

Such training image sets typically include labels and metadata to facilitate machine learning. For example, the training images may be semantically segmented to identify at least one feature of interest in the environment depicted in the training image. The semantic segmentation may include a mask, such as a preselected color superimposed over each environmental feature in each training image, to train the applied machine learning algorithm to associate the detected outline with the correct environmental feature in the environment. The training images may also include additional labels, such as a name of the environmental feature in the image, and metadata, such as a description of a viewpoint from which the image was captured, a distance to the environmental feature (e.g., if the object is runway signage, the labelling might identify a distance to the signage), etc. Known methods of generating such sets of training images are subject to several limitations. For example, an operator typically manually enters semantic segmentation to the training images, and applies masks of the appropriate colors over each environmental feature in the original image. The process is more time consuming than desired and relies on the skill of the operator. Moreover, large datasets of such training images may be in the order of thousands of images, which may make manual segmentation impractical.

BRIEF DESCRIPTION

One aspect of the present disclosure includes a method for generating a training set of images and labels for a native environment. The method is implemented on a computing system including at least one processor in communication with at least one memory device. The method includes using the at least one processor to receive a plurality of physical coordinate sets, and to retrieve, from the at least one memory device, environmental model data corresponding to a georeferenced model of the environment. The environmental model data defines a plurality of environmental features. The method also includes using the at least one processor to create a plurality of two-dimensional (2-D) rendered images from the environmental model data. Each of the 2-D rendered images corresponds to a view from one of the physical coordinate sets. The plurality of 2-D rendered images includes one or more of the environmental features. The method further includes using the at least one processor to generate linking data associating each of the 2-D rendered images with (i) labels for the one or more included environmental features and (ii) a corresponding native image. Additionally, the method includes using the at least one processor to store the training set including the 2-D rendered images, the labels, the corresponding native images, and the linking data.

Another aspect of the present disclosure includes a computing system for generating a training set of images and labels for a native environment. The computing system includes at least one processor in communication with at least one memory device. The at least one processor is configured to receive a plurality of physical coordinate sets, and to retrieve, from the at least one memory device, environmental model data corresponding to a georeferenced model of the environment. The environmental model data defines a plurality of environmental features. The at least one processor also is configured to create a plurality of two-dimensional (2-D) rendered images from the environmental model data. Each of the 2-D rendered images corresponds to a view from one of the physical coordinate sets. The plurality of 2-D rendered images includes one or more of the environmental features. The at least one processor further is configured to generate linking data associating each of the 2-D rendered images with (i) labels for the one or more included environmental features and (ii) a corresponding native image. Additionally, the at least one processor is configured to store the training set including the 2-D rendered images, the labels, the corresponding native images, and the linking data.

Yet another aspect of the present disclosure includes a non-transitory computer-readable storage medium having computer-executable instructions embodied thereon for generating a training set of images and labels for an environment. When executed by at least one processor in communication with at least one memory device, the computer-executable instructions cause the at least one processor to receive a plurality of physical coordinate sets, and to retrieve, from the at least one memory device, environmental model data corresponding to a georeferenced model of the environment. The environmental model data defines a plurality of environmental features. The computer-executable instructions also cause the at least one processor to create a plurality of two-dimensional (2-D) rendered images from the environmental model data. Each of the 2-D rendered images corresponds to a view from one of the physical coordinate sets. The plurality of 2-D rendered images includes one or more of the environmental features. The computer-executable instructions further cause the at least one processor to generate linking data associating each of the 2-D rendered images with (i) labels for the one or more included environmental features and (ii) a corresponding native image. Additionally, the computer-executable instructions cause the at least one processor to store the training set including the 2-D rendered images, the labels, the corresponding native images, and the linking data.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

FIG. 4 is an example of labels, metadata, and linking data generated by the computing system shown in FIG. 3 for a training set for the environment shown in FIG. 1.

Figure 1:
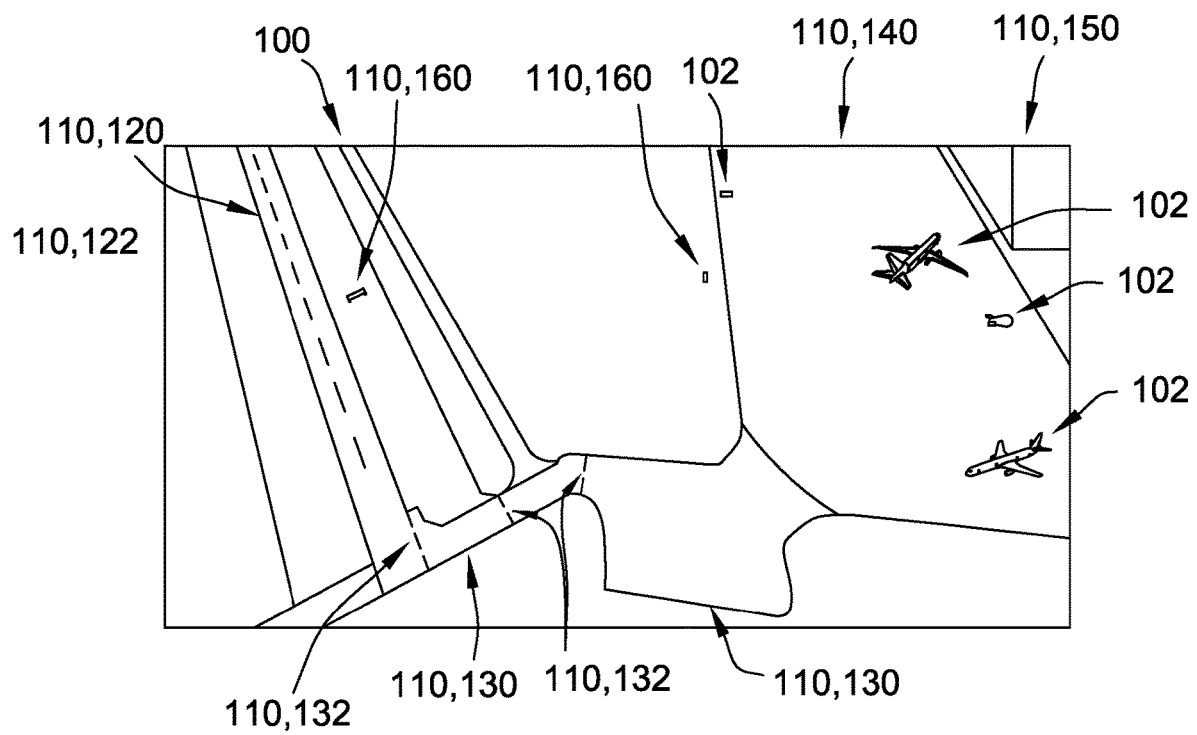
FIG. 1 is a schematic representation of an image of an example native environment as viewed from a first vantage point.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of computer-implemented methods for generating training sets of images and labels for a native environment as described herein include creating a plurality of two-dimensional (2-D) rendered images from views of a georeferenced model of a native environment. A georeferenced model is broadly defined as a model of a native environment that links an internal coordinate system of the model to a system of geographic coordinates in the physical world. For example, for a particular airport environment that includes static physical environmental features such as runways, runway markings, additional aircraft-traversable zones, and airport signage each located at specific geographic coordinates in the physical world, a georeferenced model of the environment includes corresponding virtual runways, virtual runway markings, virtual additional aircraft-traversable zones, and virtual airport signage, each defined by internal model coordinates that are linked to the geographic coordinates of the corresponding physical features. Simulated or "rendered" perspective views of the virtual environment are obtainable from the georeferenced model using suitable rendering algorithms (e.g., ray tracing), based on an input set of spatial coordinates (e.g., geographic "physical" location coordinates and physical orientation of the viewpoint) for a selected viewpoint.

The systems and methods disclosed herein are particularly useful for, although not limited to, airport environments because detailed georeferenced models already have been developed for many airports. They also are particularly useful for, although not limited to, regulated or controlled environments, again such as airports, because the nature and placement of environmental features can be expected not to vary significantly over time.

Examples also include generating linking data associating each of the 2-D rendered images with (i) labels for the one or more included environmental features and (ii) a corresponding native image, and storing the 2-D rendered images, the labels, the corresponding native images, and the linking data in the training set. Examples of creating the 2-D rendered images include detecting, using the environmental model data, that at least one of the environmental features appears in the corresponding view, and rendering, for each detected environmental feature, a plurality of pixels that define the detected environmental feature in the 2-D rendered image. Examples of creating the labels include associating with each 2-D rendered image a label corresponding to each detected environmental feature in the 2-D rendered image.

In particular, because the 2-D rendered images are cleanly generated from the georeferenced model with no uncontrolled or unnecessary elements in the image, the pixels representing the environmental features in each 2-D rendered image are precisely identifiable by the computing system, and a suitable algorithm can be applied by the computing system to automatically build or "fill in" the semantic segmentation for the pixels of each environmental feature, with little or no intervening input required from a human operator. Accordingly, the systems and methods of the present disclosure replace the manual effort and subjective judgment required by prior art methods for semantic segmentation of images with high-speed, automated generation of semantic segmentation images that are objectively accurate on a pixel-by-pixel basis, because each semantic segmentation is precisely grounded in the pixels of the environmental feature in the 2-D rendered image.

In some examples, the physical coordinate sets used to generate the 2-D rendered images define a path through the environment. For example, the physical coordinate sets may be obtained by recording the coordinates and orientation of a vehicle traveling along the path, such as by using an on-board Global Positioning Satellite (GPS) system, inertial measurement unit (IMU), and/or other on-board geo-locating system of the vehicle. Thus, training image sets can be easily created for typical situations encountered by a selfguided vehicle, such as standard approaches by an aircraft to each runway of an airport, or standard ground paths of a luggage transport vehicle to each gate area of the airport. In some such examples, the vehicle used to "capture" the path coordinates also carries sensors (e.g., cameras), and images from the sensors are tagged with the physical coordinates of the vehicle, or linked to the physical coordinates of the vehicle along the path by matching timestamps with the on-board GPS system. Thus, each 2-D rendered image, e.g., semantic segmentation image, automatically generated at each set of physical coordinates can be linked to the native or "real" camera image captured at that physical coordinate set, and the camera images can be used as the native images of the training set.

Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

FIG. 1 is an example schematic representation of an image of a native environment 100 as viewed from a first vantage point. Environment 100 includes a plurality of static, physical environmental features, referred to collectively as environmental features 110, each associated with corresponding geographic coordinates in the physical world. In the example, the image of native environment 100 also includes a plurality of objects 102 that are not included in the georeferenced model. For example, objects 102 are temporary or dynamic physical objects that may be found in different places at different times within native environment 100.

In the example, native environment 100 is an airport, and environmental features 110 include permanent or semi-permanent features typically present in an airport environment. For example, environmental features 110 include a runway 120 and a centerline 122 of runway 120. Although only one runway 120 is shown from the vantage point used to obtain the image in FIG. 1, it should be understood that native environment 100 may include any suitable number of runways 120. Environmental features 110 also include a plurality of taxiways 130 and position markings 132. For example, position markings 132 are surface markings of runway holding positions, taxiway intersections, and/or taxiway/runway intersections. Environmental features 110 further include an apron 140 and a building 150, such as a hangar or terminal. In addition, environmental features 110 include a plurality of signs 160, such as runway/taxiway location and/or direction signs. While the environmental features 110 listed above are typical of airport environments, they are not exclusive or required for native environment 100.

Although aspects of the disclosure are described in terms of an airport environment for illustrative purposes, in alternative implementations, native environment 100 is any suitable environment that includes environmental features 110 that may be characterized as static, physical environmental features.

Figure 3A:
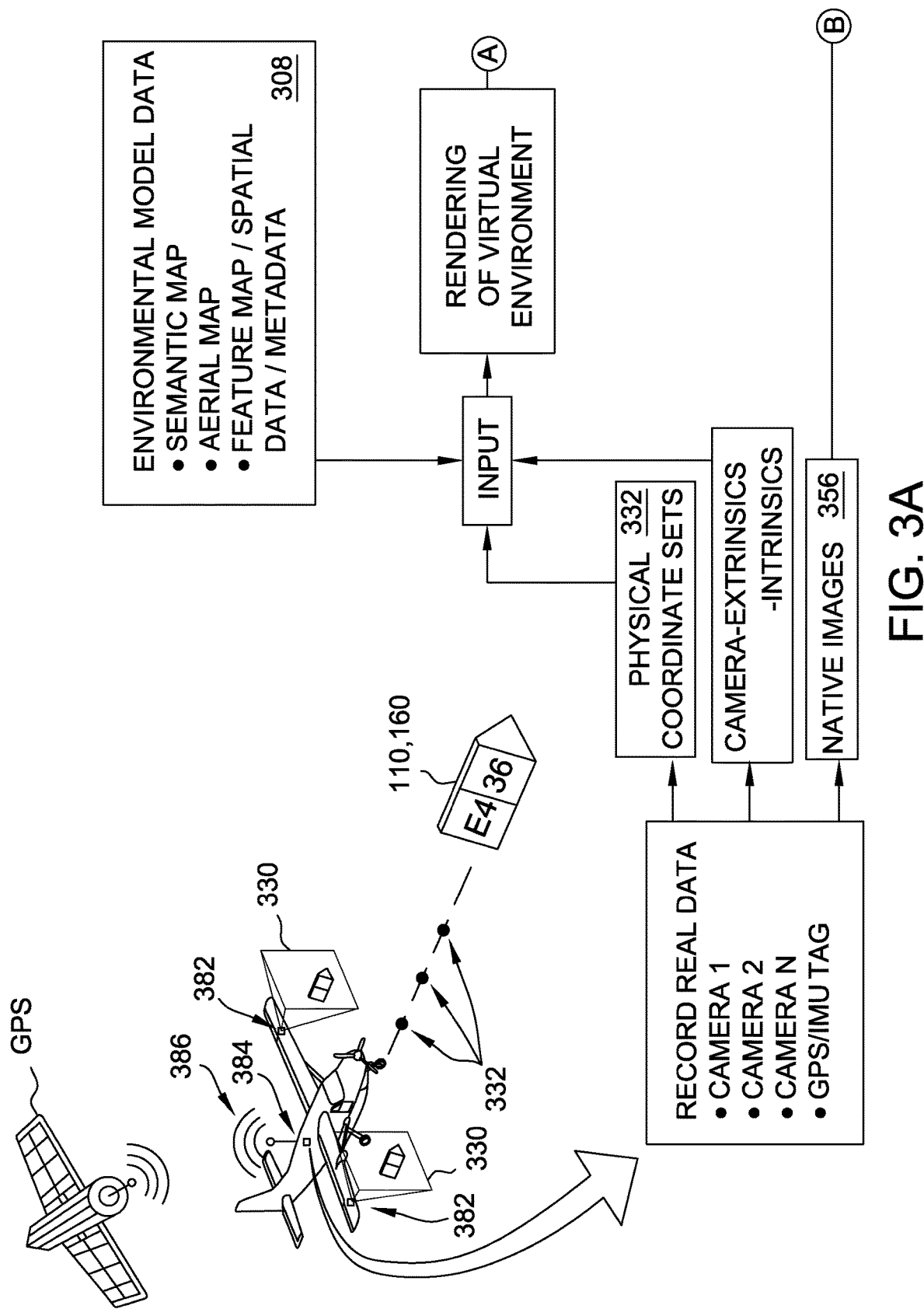
FIG. 3A is a schematic representation of an example data acquisition and processing framework for generating a training set of images and labels for a native environment, such as the native environment of FIG. 1.
Figure 3B:
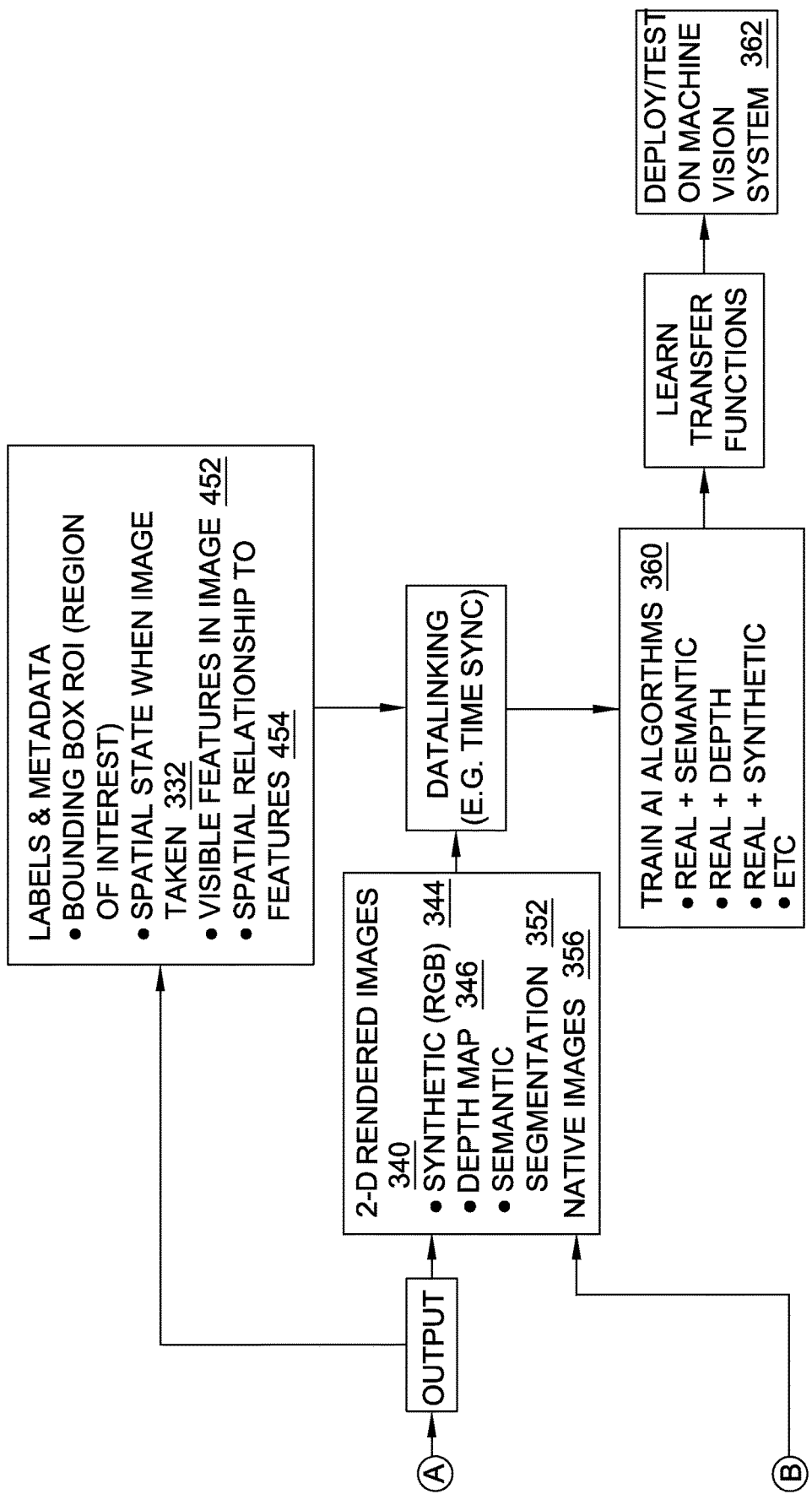
FIG. 3B is a continuation of the data acquisition and processing framework of FIG. 3A.
Figure 3C:
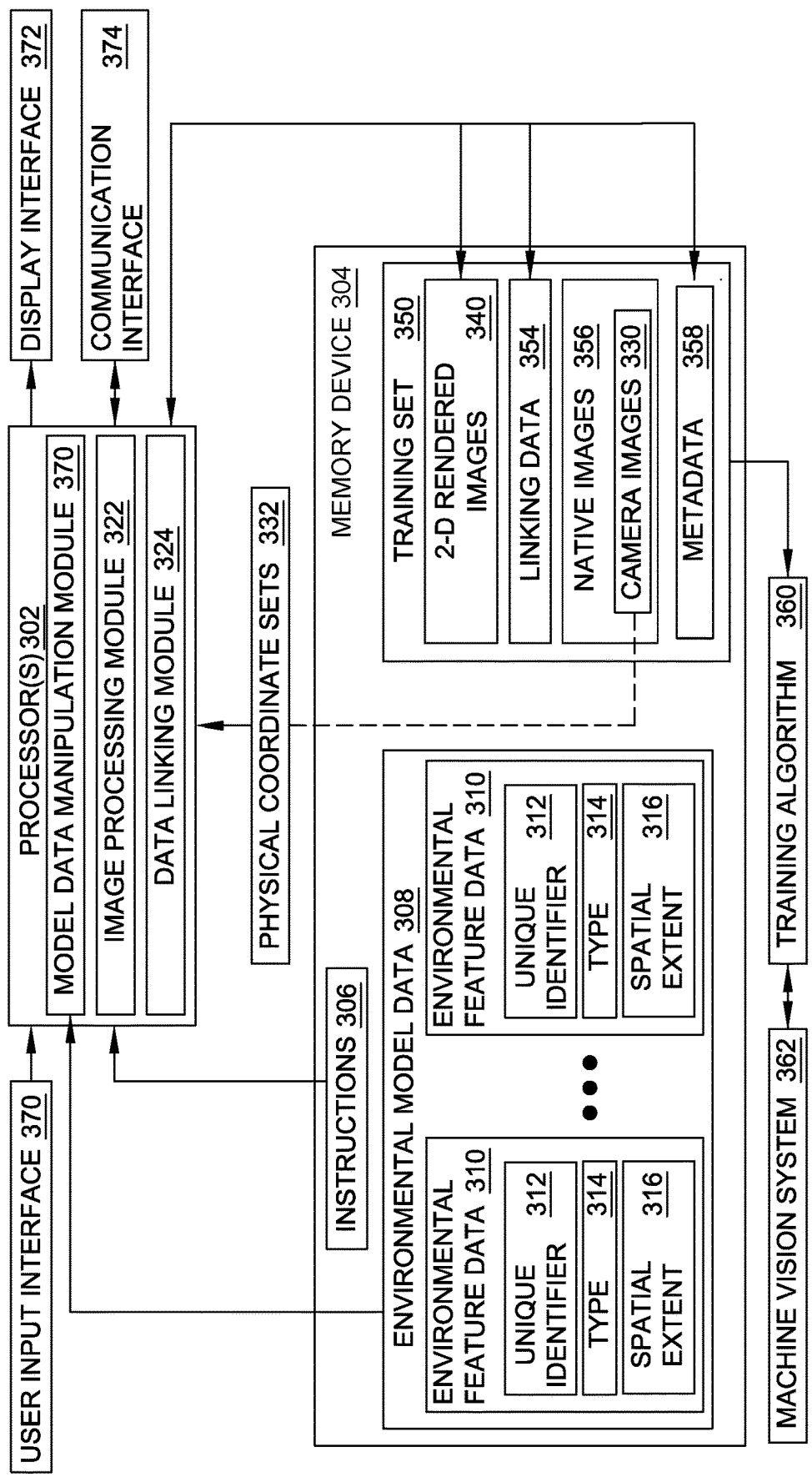
FIG. 3C is a schematic block diagram of an example computing system for generating a training set of images and labels for a native environment, such as the native environment of FIG. 1.

FIGS. 3A and 3B are a schematic representation of an example data acquisition and processing framework for generating a training set of images and labels for native environment 100. FIG. 3C is a schematic block diagram of an example computing system 300 for generating a training set of images and labels for native environment 100 that may be used to implement the framework of FIGS. 3A and 3B. In particular, computing system 300 includes at least one processor 302 configured to generate 2-D rendered images 340 from a georeferenced model of native environment 100.

Starting with FIG. 3C, the at least one processor 302 is configurable to perform one or more operations described herein via programming the at least one processor 302. For example, the at least one processor 302 is programmed to execute a model data manipulation module 320, an image processing module 322, a data linking module 324, and/or other suitable modules which perform steps as described below.

In the example, computing system 300 includes at least one memory device 304 operatively coupled to the at least one processor 302, and the at least one processor 302 is programmed by encoding an operation as one or more computer-executable instructions 306 and providing the computer-executable instructions 306 in the at least one memory device 304. In some examples, the computer-executable instructions are provided as a computer program product by embodying the instructions on a non-transitory computer-readable storage medium. The at least one processor 302 includes, for example and without limitation, a graphics card processor, another type of microprocessor, a microcontroller, or other equivalent processing device capable of executing commands of computer readable data or programs for executing model data manipulation module 320, image processing module 322, data linking module 324, and/or other suitable modules as described below. In some examples, the at least one processor 366 includes a plurality of processing units, for example and without limitation, coupled in a multi-core configuration. In certain examples, the at least one processor 302 includes a graphics card processor programmed to execute image processing module 322 and a general-purpose microprocessor programmed to execute model data manipulation module 320, data linking module 324, and/or other suitable modules.

In the example, the at least one memory device 304 includes one or more devices that enable storage and retrieval of information such as executable instructions and/or other data. The at least one memory device 304 includes one or more computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are examples only, and are thus not limiting as to the types of memory usable as the at least one memory device 304. The at least one memory device 304 is configured to store, without limitation, application source code, application object code, source code portions of interest, object code portions of interest, configuration data, execution events, and/or any other type of data.

In the example, computing system 300 includes a display device 372 coupled to the at least one processor 302. Display device 372 presents information, such as a user interface, to an operator of computing system 300. In some examples, display device 372 includes a display adapter (not shown) that is coupled to a display device (not shown), such as a cathode ray tube (CRT), a liquid crystal display (LCD), an organic LED (OLED) display, and/or an "electronic ink" display. In some examples, display device 372 includes one or more display devices.

In the example, computing system 300 includes a user input interface 370. User input interface 370 is coupled to the at least one processor 302 and receives input from an operator of computing system 300. User input interface 370 includes, for example, a keyboard, a pointing device, a mouse, a stylus, a touch sensitive panel, e.g., without limitation, a touch pad or a touch screen, and/or an audio input interface, e.g., without limitation, a microphone. A single component, such as a touch screen, is capable of functioning as both display device 372 and user input interface 370.

In some examples, computing system 300 includes a communication interface 374. Communication interface 374 is coupled to the at least one processor 302 and is configured to be coupled in communication with one or more remote devices, such as but not limited to a network server, and to perform input and output operations with respect to such devices. For example, communication interface 374 includes, without limitation, a wired network adapter, a wireless network adapter, a mobile telecommunications adapter, a serial communication adapter, and/or a parallel communication adapter. Communication interface 374 receives data from and/or transmits data to the one or more remote devices for use by the at least one processor 302 and/or storage in the at least one memory device 304.

In other examples, computing system 300 is implemented in any suitable fashion that enables computing system 300 to perform the steps described herein.

With reference also to FIG. 1, the at least one processor 302 has access to environmental model data 308 corresponding to a georeferenced model of environment 100. Environmental model data 308 may be compiled using, for example, aerial maps, semantic maps, feature maps, and/or other suitable spatial data or metadata regarding environment 100. In the example, environmental model data 308 is stored in the at least one memory device 304, and the at least one processor 302 is programmed to retrieve environmental model data 308 from the at least one memory device 304.

Environmental model data 308 includes data associated with each of environmental features 110. More specifically, environmental model data 308 includes, for example, a unique identifier 312 for each environmental feature 110 and a type 314 of each environmental feature 110. Environmental model data 308 also includes a spatial extent 316 of each environmental feature 110 within environment 100. In particular, spatial extent 316 of each environmental feature 110 stored in environmental model data 308 is linked to the geographic coordinates of the environmental feature 110. In the example, because objects 102 are not static physical environmental features of environment 100, objects 102 are not represented in environmental model data 308.

As noted above, in the example, environment 100 is an airport, and environmental model data 308 includes unique identifier 312 and type 314 for each runway 120, centerline 122 of runway 120, taxiway 130, position marking 132, apron 140, building 150, and sign 160. More specifically, each individual environmental feature 110 has unique identifier 312 that differs from unique identifier 312 of every other environmental feature 110 included in the georeferenced model. Environmental features 110 of a like category (e.g., runways 120, signs 160) share an identical type 314. The categorization described for the example is non-limiting. For example, signs 160 may be further divided into types 314 for runway signs, apron signs, etc. Alternatively, type 314 is not included in environmental model data 308 for at least some environmental features 110.

Spatial extent 316 of each environmental feature 110 may be determined from semantic map data for a reference viewpoint, feature map data for a reference viewpoint, and/or other metadata within environmental model data 308. Additionally or alternatively, spatial extent 316 is stored using values in a predefined data structure. Different data structures may be defined to correspond to the type 314 of environmental feature 110. For example, spatial extent 316 is defined for certain environmental features 110 using boundary coordinates. Alternatively, spatial extent 316 is defined and/or stored in any suitable fashion that enable computer system 300 to function as described herein.

The at least one processor 302 also is programmed to receive a plurality of physical coordinate sets 332. In the example, physical coordinate sets 332 are stored in the at least one memory device 304, and the at least one processor 302 is programmed to retrieve physical coordinate sets 332 from the at least one memory device 304. Each physical coordinate set 332 defines a vantage point in physical space from which environment 100 is viewable. For example, each physical coordinate set 332 includes a location (e.g., latitude, longitude, elevation) and direction of view from the location (e.g., heading, angle of attack, roll angle). Taken together, the plurality of physical coordinate sets 332 represents an ensemble of vantage points, e.g., spatial relationship of the viewer in terms of six degrees of freedom relative to the geospatial coordinate system, for images in a training set 350 to be used to train a machine vision system 362. More specifically, training set 350 includes native images 356 and corresponding 2-D rendered images 340, and a training algorithm 360 is programmed to use corresponding pairs of native images 356 and 2-D rendered images 340 to train machine vision system 362 to recognize environmental features 110.

In some examples, physical coordinate sets 332 define a path through environment 100. For example, physical coordinate sets 332 are a sequence of points through which a UAV or other aircraft might travel through approach and landing on runway 120, and/or through taxiing on taxiways 130 and apron 140 towards building 150. For another example, physical coordinate sets 332 are a sequence of points through which a self-driving luggage transport vehicle (not shown) might travel between building 150 and various gate locations on apron 140. Alternatively, physical coordinate sets 332 are not associated with a path through environment 100.

In some examples, the at least one processor 302 receives a plurality of camera images 330 each associated with one of physical coordinate sets 332. For example, a test vehicle 380 having cameras 382 mounted thereon traverses the path defined by physical coordinate sets 332, and recording equipment 384 records camera images 330 captured along the path. It should be understood that the terms "camera images" and "camera" refer broadly to any type of image acquirable by any type of image capture device, and are not limited to images captured in visible light or images captured via a lensed camera. In certain examples, the at least one processor 302 is programmed to receive camera images 330 via communication interface 374 and store camera images 330 in the at least one memory device 304. Moreover, in some examples, the at least one processor 302 is programmed to include camera images 330 in training set 350 as native images 356. Alternatively, the at least one processor 302 is not programmed to receive camera images 330, and/or camera images 330 are not included as native images 356 in training set 350.

In certain examples, each of camera images 330 includes a corresponding geo-coordinate tag, and the at least one processor 302 is programmed to receive physical coordinate sets 332 by extracting the geo-coordinate tags from camera images 330. For example, the test vehicle also includes an on-board geo-locating system 386 such as a GPS receiver and/or inertial measurement unit (IMU), and as test vehicle 380 captures each camera image 330 along the path, the corresponding physical coordinate set 332 is captured from on-board geo-locating system 386 and embedded in the captured camera image 330 as the geo-coordinate tag. Alternatively, camera images 330 and physical coordinate sets 332 are recorded separately with time stamps by cameras 382 and on-board geo-location system 386, respectively, and the respective time stamps are synchronized to associate each camera image 330 with the correct physical coordinate set 332. Alternatively, the at least one processor 302 is programmed to receive physical coordinate sets 332 in any suitable fashion, such as a listing of numeric coordinate and orientation values in, e.g., a text file. In some examples, the at least one memory device 304 further stores a displacement and orientation of each camera 382 relative to a location and orientation of on-board geo-locating system 386, and the at least one processor 302 is programmed to adjust, for each camera 382, the geo-coordinate tags based on the displacement and orientation of the respective camera 382 to obtain a more accurate physical coordinate set 332.

As discussed above, prior art systems for creating a training set would require a human operator to manually identify environmental features 110 in camera images 330 and semantically segment each environmental feature 110 in each camera image 330 in order to complete the training image set, which would be extremely time-intensive and which would result in a subjective, not strictly accurate fit of the environmental features 110 on a pixel-by-pixel basis. Computing system 300 provides advantages over such prior art systems by creating 2-D rendered images 340 from environmental model data 308 and automatically semantically segmenting 2-D rendered images 340 to create semantic segmentation images 352.

In the example, each of the 2-D rendered images 340 corresponds to a view from one of the physical coordinate sets 332. For example, the at least one processor 302 is programmed to apply a suitable rendering algorithm to environmental model data 308 to detect each environmental feature 110 that appears in the view defined by a given physical coordinate set 332, and to render, for each detected environmental feature 110, a plurality of pixels 342 that define the detected environmental feature 110 in the resulting 2-D rendered image 340. For example, spatial extent 316 enables the at least one processor 302 to determine whether the corresponding environmental feature 110 appears within a bounding box, or region of interest (ROI), associated with the view of environment 100 defined by the specified physical coordinate set 332. The algorithm maps the view defined by physical coordinate set 332 against spatial extent 316 of each detected environmental feature 110 in the ROI to render the plurality of pixels 342. Suitable rendering algorithms, such as but not limited to ray-tracing algorithms, are known and need not be discussed in depth for purposes of this disclosure. One such ray-tracing algorithm is provided in the Unity Pro product sold by Unity Technologies ApS of San Francisco, Calif. In the example, each 2-D rendered image 340 is stored as a portable network graphic (PNG) image file in the at least one memory device 304. Alternatively, each 2-D rendered image 340 is stored in any suitable format that enables training set 350 to function as described herein.

In the example, the at least one processor 302 is programmed to create 2-D rendered images 340 including semantic segmentation images 352. More specifically, to create each semantic segmentation image 352, the at least one processor 302 is programmed to apply a visualization mode that renders plurality of pixels 342 corresponding to each detected environmental feature 110 in a corresponding semantic color. In some examples, the at least one processor 302 is programmed in the semantic segmentation visualization mode to associate each type 314 of environmental feature 110 with a pre-selected color, and, for each detected environmental feature 110 in 2-D rendered image 340, to render the pixels 342 with the pre-selected color associated with type 314 of the respective environmental feature 110. Thus, for example, all runways 120 may be rendered with an identical bright red color to create semantic segmentation images 352. In some examples, "background" pixels not corresponding to detected environmental features 110 are rendered in a neutral background color to enhance a contrast with pixels 342, or alternatively rendered in a naturalized RGB background palette. For example, the color key for each type 314 is included in metadata 358 of training set 350, or training algorithm 360 is otherwise programmed to associate each pre-selected color with the corresponding type 314 of environmental feature 110. Advantageously, because the at least one processor 302 automatically and precisely determines pixels 342 corresponding to each of the detected one or more environmental features 110 in the course of rendering of 2-D rendered image 340, and automatically colors precisely those pixels 342 to create semantic segmentation images 352, computing system 300 generates semantic segmentation images 352 having precise pixel-level accuracy in a high-speed process that requires no manual study or manual manipulation of native images 356.

In the example, the at least one processor 302 is programmed to selectively create 2-D rendered images 340 in a plurality of visualization modes. For example, in addition to the above-described visualization mode for creating semantic segmentation images 352, the at least one processor 302 is programmed to apply an RGB visualization mode to create additional 2-D rendered images 340 for each physical coordinate set 332. For example, the plurality of pixels 342 corresponding to each detected environmental feature 110 is rendered in a naturalized red-green-blue (RGB) feature palette, associated for example with the respective type 314 or unique identifier 312 of the detected environmental feature 110, and the background is further rendered in a naturalized RGB background palette to create a 2-D synthetic image 344 that approximates a physical appearance of the corresponding native image 356. In some such embodiments, each semantic segmentation image 352 may be conceptualized as corresponding to an underlying 2-D synthetic image 344, but having a feature-type-based semantic color superimposed on each environmental feature 110. For another example, the at least one processor 302 is programmed to apply a depth-map visualization mode to create additional 2-D rendered images 340 for each physical coordinate set 332. In the depth-map visualization mode, the plurality of pixels 342 corresponding to each detected environmental feature 110 are rendered in a color scale corresponding to a physical distance of the pixels 342 from the location coordinates of physical coordinate set 332 to create a 2-D depth map 346. Each of 2-D synthetic (RGB) images 344 and 2-D depth maps 346 may be used in training set 350 to improve a performance of training algorithm 360. In some examples, the at least one processor 302 is programmed to apply additional or alternative visualization modes to create additional 2-D rendered images 340 for each physical coordinate set 332.

Figure 2A:
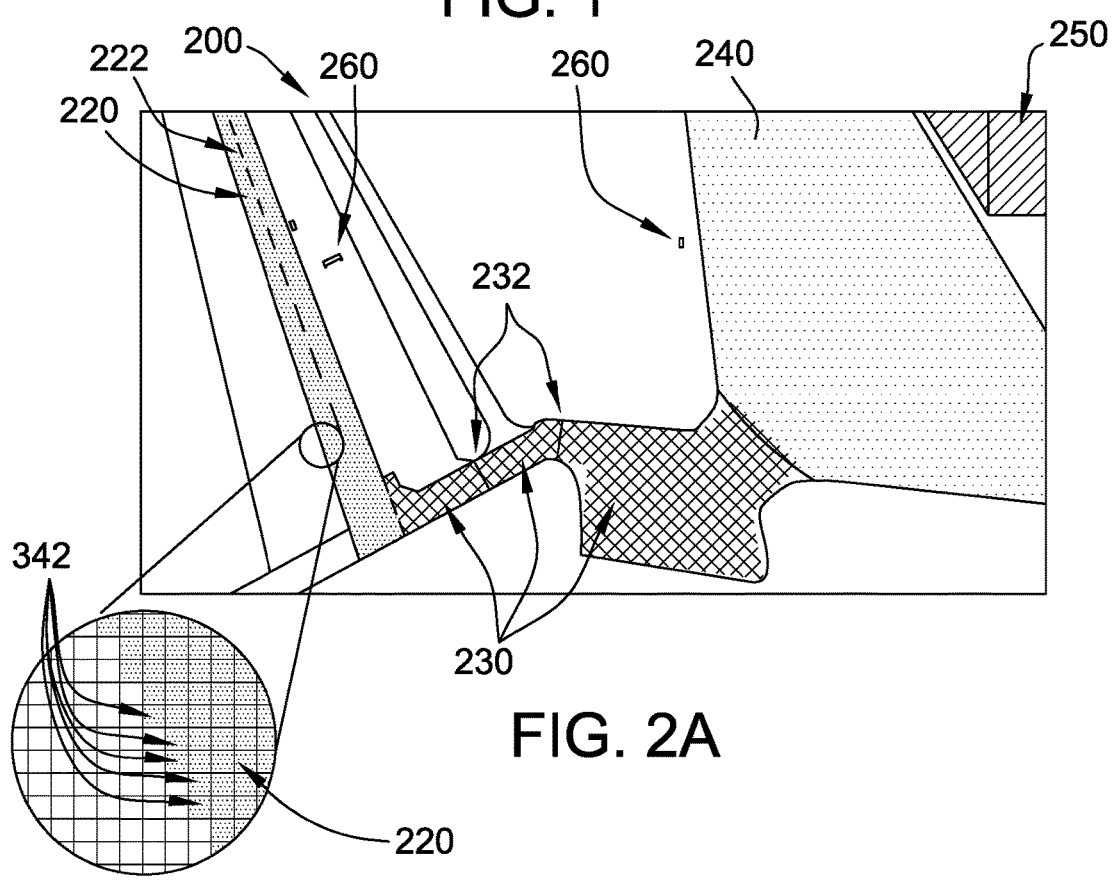
FIG. 2A is a schematic representation of an example semantic segmentation image of the native environment of FIG. 1 as viewed from the first vantage point.
Figure 2B:
FIG. 2B is a detail view of FIG. 2A.

Turning now to FIG. 2A, a schematic representation of an example semantic segmentation image 352 of environment 100 as viewed from the first vantage point of FIG. 1 is presented. FIG. 2B is a detail view of FIG. 2A. The one or more environmental features 110 detected by the rendering algorithm, based on environmental feature data 310, include runway 120, centerline 122 of runway 120, taxiways 130, position markings 132, apron 140, building 150, and signs 160 (shown in FIG. 1). The at least one processor 302 renders pixels 342 corresponding to runway 120 with a first color 220, renders pixels 342 corresponding to centerline 122 with a second color 222, renders pixels 342 corresponding to taxiways 130 with a third color 230, renders pixels 342 corresponding to position markings 132 with a fourth color 232, renders pixels 342 corresponding to apron 140 with a fifth color 240, renders pixels 342 corresponding to building 150 with a sixth color 250, and renders pixels 342 corresponding to signs 160 with a seventh color 260.

FIG. 4 is an example of labels 404 and 452, metadata 358, and linking data 354 generated by computing system 300 for training set 350 for environment 100. The process of generating training set 350 further includes using the at least one processor 302 to generate linking data 354 associating each 2-D rendered image 340 with the corresponding native image 356. In the example, the at least one processor 302 generates linking data 354 as a data structure 400 that includes a plurality of records 401. For example, data structure 400 is a comma separated value (CSV) file or a table in a database. Each record 401 includes a first pointer 402 to at least one of the 2-D rendered images 340 and a second pointer 403 to the corresponding native image 356. Training algorithm 360 is configured to parse training set 350 for corresponding pairs of 2-D rendered images 340 and native images 356 based on the information in data structure 400. It should be understood that the term "pointer" as used herein is not limited to a variable that stores an address in a computer memory, but rather refers more broadly to any element of information that identifies a location (e.g., file path, memory location) where an object (e.g., 2-D rendered image 340, native image 356) associated with the pointer is accessible.

In the example, first pointer 402 is implemented as a file path and file name of an image file stored in the at least one memory device 304 and storing 2-D rendered image 340, and second pointer 403 is implemented using time metadata 440 corresponding to a time at which the corresponding native image 356 was captured as camera image 330. For example, a timestamp is stored with each native image 356 (e.g., as metadata in the image file). Training algorithm 360 parses the timestamp stored with each native image 356, finds a corresponding timestamp 442 in time metadata 440 of one of records 401, and follows first pointer 402 in the identified record 401 to find the 2-D rendered image 340 corresponding to native image 356.

Alternatively, physical coordinate set 332 is used as second pointer 403, and is used to match each native image 356 to a corresponding record 401 in similar fashion as described above for timestamp 442. For example, physical coordinate set 332 used to generate 2-D rendered image 340 is stored in the corresponding record 401, and matched against the physical coordinate set captured and stored with the respective native image 356 (e.g., as metadata in the image file). Alternatively, second pointer 403 is implemented as a file name and path to the stored native image 356. Alternatively, each record 401 includes first pointer 402 and second pointer 403 implemented in any suitable fashion that enables training set 350 to function as described herein.

Alternatively, each record 401 links 2-D rendered image 340 to the corresponding native image 356 in any suitable fashion that enables training set 350 to function as described herein.

In the example, training set 350 includes visualization mode labels 404 for each 2-D rendered image 340. For example, data structure 400 includes label 404 for the 2-D rendered image 340 associated with each record 401. Visualization mode label 404 identifies the visualization mode used to create the image, such as "SEM" for semantic segmentation image 352, "RGB" (i.e., red-green-blue) for 2-D synthetic (RGB) image 344, and "DEP" for depth map 346. Alternatively, visualization mode label 404 is not included in training set 350. For example, training set 350 includes 2-D rendered images 340 of a single visualization mode.

In the example, training set 350 further includes feature labels 452 for each environmental feature 110 detected in 2-D rendered image 340. For example, feature label 452 is a text string based on unique identifier 312 and/or type 314 of the detected environmental feature 110. Although only one feature label 452 is illustrated in each record 401 in FIG. 4, it should be understood that any number of feature labels 452 may be included in each record 401 based on a number of detected environmental features 110 in the corresponding 2-D rendered image 340. Additionally or alternatively, training set 350 includes any suitable additional or alternative labels that enable training set 350 to function as described herein.

In some examples, each record 401 also includes metadata 358. In the example of FIG. 4, in cases where physical coordinate set 332 is not already present as second pointer 403, metadata 358 includes physical coordinate set 332. In the example, physical coordinate set 332 is represented as a latitude 432, longitude 434, elevation 436, and heading 438. Additional orientation variables in physical coordinate set 332 include, for example, angle of attack and roll angle (not shown) Alternatively, each record 401 is associated with physical coordinate set 332 in any suitable fashion that enables training set 350 to function as described herein. In some implementations, physical coordinate set 332 is represented by additional and/or alternative data fields in any suitable coordinate system (e.g., polar coordinates or WGS84 GPS) relative to the georeferenced model.

In the example, metadata 358 also includes a sensor index 406 for the corresponding native image 356. For example, test vehicle 380 includes multiple cameras 382, and the one of the multiple cameras 382 associated with native image 356 corresponding to second pointer 403 in record 401 is identified by sensor index 406. In some examples, as discussed above, the at least one memory device 304 stores a displacement and orientation of each camera 382 relative to a location and orientation of on-board geo-locating system 386, and the at least one processor 302 retrieves the stored displacement and orientation based on sensor index 406 to adjust physical coordinate set 332 for the corresponding camera 382. Alternatively, sensor index 406 is not included in metadata 358.

In the example, metadata 358 further includes time metadata 440. For example, time metadata 440 includes a relative time 444 of traversal along the path as calculated from timestamp 442. In cases where timestamp 442 is not already present as second pointer 403, metadata 358 also includes timestamp 442. Alternatively, metadata 358 does not includes time metadata 440.

In some examples, metadata 358 further includes spatial relationship metadata 454 associated with at least some feature labels 452. More specifically, spatial relationship metadata 454 defines a spatial relationship between physical coordinate set 332 and the detected environmental feature 110 corresponding to feature label 452. For example, training algorithm 360 is configured to train machine vision system 362 to recognize a distance to certain types 314 of environmental features 110, and spatial relationship metadata 454 is used for that purpose in training algorithm 360. In some examples, the at least one processor 302 is programmed to use spatial relationship metadata 454 in creating 2-D depth map 346, as discussed above.

In the example, spatial relationship metadata 454 is implemented as a distance. More specifically, the at least one processor 302 is programmed to, for each 2-D rendered image 340, calculate, based on environmental model data 308, a straight-line distance from the corresponding physical coordinate set 332 to each detected environmental feature 110. Alternatively, spatial relationship metadata 454 includes any suitable set of parameters, such as relative (x, y, z) coordinates.

In the example, the at least one processor 302 is programmed to generate additional linking data 450 associating spatial relationship metadata 454 with the corresponding 2-D rendered image 340, and store, in the at least one memory device 304, spatial relationship metadata 454 and the additional linking data 450 as a portion of training set 350. For example, additional linking data 450 is implemented by including each feature label 452 and the corresponding spatial relationship metadata 454 in the record 401 of data structure 400 corresponding to 2-D rendered image 340. Alternatively, spatial relationship metadata 454 and/or the additional linking data 450 are stored as part of training set 350 in any suitable fashion that enables training set 350 to function as described herein. For example, the additional linking data 450 and spatial relationship metadata 454 are stored in the metadata of an image file storing the corresponding 2-D rendered image 340.

It should be understood that in some implementations, linking data 354 includes additional and/or alternative fields from those shown in FIG. 4.

Figure 5A:
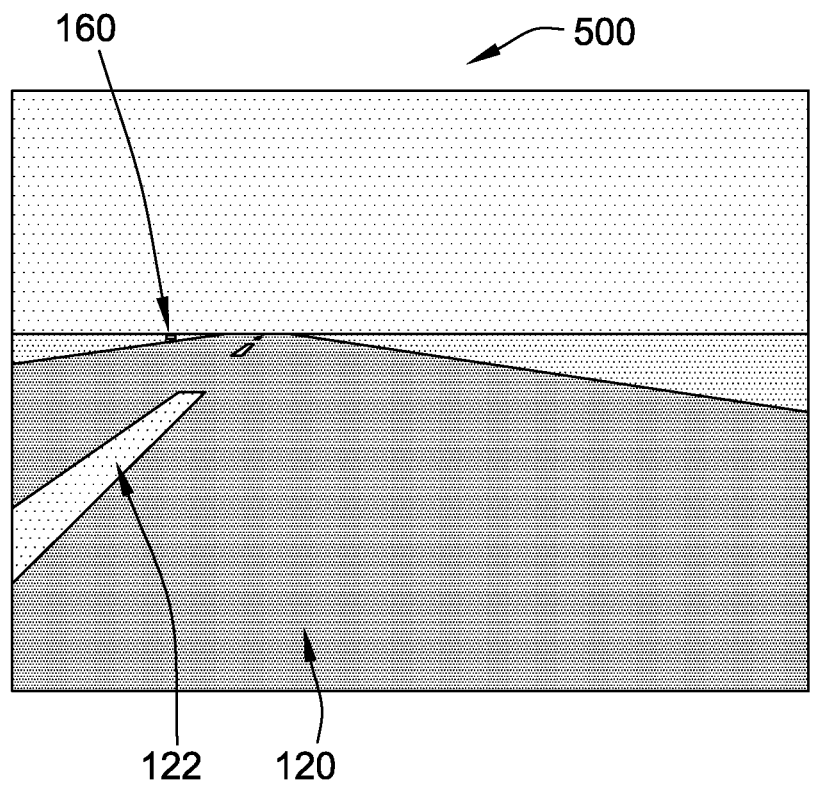
FIG. 5A is an example of a baseline 2-D rendered image that may be created by the computing system shown in FIG. 3.
Figure 5B:
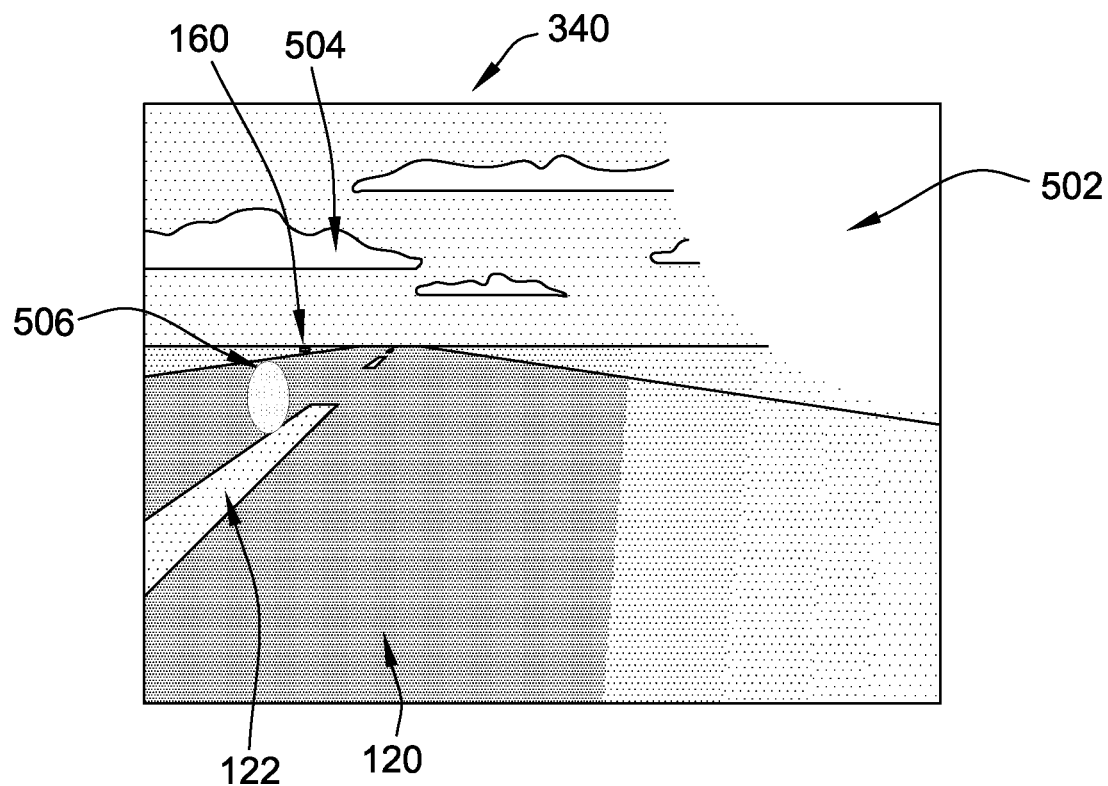
FIG. 5B is an example of a 2-D rendered image that may be created by the computing system shown in FIG. 3, having a simulated environmental variation and background added thereto.

FIG. 5A is an example of a baseline 2-D rendered image 500 created from environmental model data 308 and one of physical coordinate sets 332 as discussed above. FIG. 5B is an example of 2-D rendered image 340 corresponding to baseline 2-D rendered image 500 and having a simulated environmental variation 502 and background 504 added thereto.

In the example, baseline 2-D rendered image 500 is one of 2-D rendered images 340 generated from environmental model data 308 using, for example, a ray-tracing algorithm and including default background image aspects and/or default variable environmental effects (e.g., weather, time-of-day lighting effects). In some cases, native images 356 and/or the images machine vision system 362 sees in the field through its one or more cameras may include diverse backgrounds, weather, and/or time-of-day lighting. In certain examples, this could lead to a mismatch between native images 356 and 2-D rendered images 340 in training set 350, on the one hand, and the images machine vision system 362 sees in the field through its one or more cameras, which would potentially degrade the effectiveness of training set 350.

In some examples, the at least one processor 302 is further programmed to create 2-D rendered images 340 having a plurality of simulated environmental variations 502 and/or backgrounds 504 to account for such diversity in the real-world images. In some such implementations, the at least one processor 302 is programmed to apply a plurality of modifications to environmental model data 308, each modification corresponding to a different environmental variation 502 and/or different background 504. For example, environmental model data 308 is modified to include different positions of the sun, resulting in the rendering of 2-D rendered images 340 that include environmental variations 502 and backgrounds 504 representative of different time-of-day lighting effects. For another example, environmental model data 308 is modified to include a 3-D distribution of water droplets corresponding to a selected cloud, fog, or precipitation profile in environment 100, and the at least one processor 302 is programmed to associate suitable light-scattering/light-diffraction properties with the water droplets, resulting in the rendering of 2-D rendered images 340 that include that include environmental variations 502 and backgrounds 504 representative of weather-induced visibility effects and/or cloud formation backgrounds.

Additionally or alternatively, the at least one processor 302 is programmed to apply the ray-tracing algorithm solely with default background image aspects and/or default variable environmental effects to produce baseline 2-D rendered images 500, and to apply 2-D modifications directly to baseline 2-D rendered images 500 to create additional 2-D rendered images 340 having the plurality of simulated environmental variations 502 and/or backgrounds 504. For example, the at least one processor 302 is programmed to superimpose each baseline 2-D rendered image 500 over stock 2-D images representing a plurality of different backgrounds 504 to create additional 2-D rendered images 340 having, e.g., different cloud formation backgrounds. In one implementation, the at least one processor 302 identifies portions of baseline 2-D rendered images 500 corresponding to the sky, flags those portions for deletion in favor of the pixels of background 504 when baseline 2-D rendered images 500 are superimposed over background 504 (e.g., the at least one processor 302 treats those portions as a "green screen"), and superimposes each modified baseline 2-D rendered image 500 over one or more weather and/or time of day backgrounds 504 to create one or more additional 2-D rendered images 340 from each baseline 2-D rendered image 500. For example, FIG. 5B illustrates the baseline 2-D rendered image 500 from FIG. 5A, which includes runway 120, centerline 122, and one of signs 160, superimposed over a "cloudy day" background 504.

For another example, the at least one processor 302 is programmed to apply a 2-D lighting effect algorithm to baseline 2-D rendered images 500 to create additional 2-D rendered images 340 having environmental variations 502 corresponding to particular times of day or other ambient light conditions in environment 100. In the example illustrated in FIG. 5B, a "lens flare" environmental variation 502 is added to the baseline 2-D rendered image 500 shown in FIG. 5A, and is created by a lighting modification algorithm propagated from an upper right-hand corner of baseline 2-D rendered image 500. For another example, a raindrop algorithm simulates a rain drop 506 on a camera lens by applying a localized fisheye-lens distortion to one or more random locations on baseline 2-D rendered image 500 to create a corresponding additional 2-D rendered image 340. In some examples, similar 2-D modifications to baseline 2-D rendered image 500 are used to create additional 2-D rendered images 340 having environmental variations 502 that represent reduced visibility caused by clouds or fog.

Accordingly, computing system 300 enables generation of a set of training images of an environment under a variety of environmental conditions without any need to wait for or rely on changes in time of day or weather conditions.

Additionally or alternatively, the at least one processor 302 is programmed to create 2-D rendered images 340 having environmental variations 502 and/or different backgrounds 504 in any suitable fashion that enables training set 350 to function as described herein, or is not programmed to include environmental variations 502 and/or backgrounds 504.

Figure 6A:
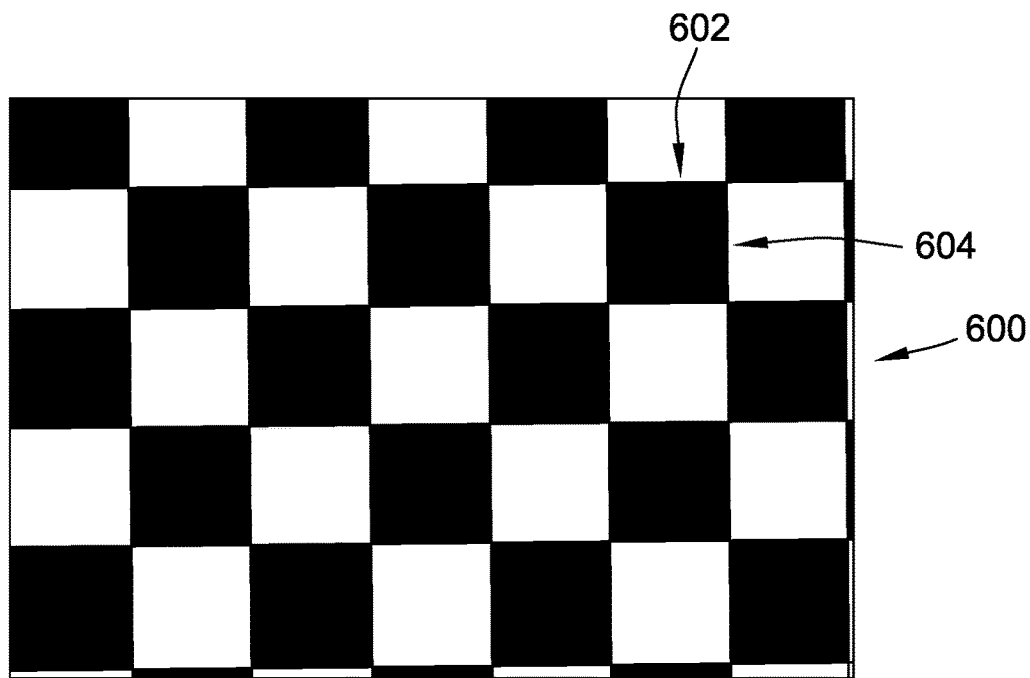
FIG. 6A is an example of a physical test pattern that may be viewed by a camera used by a machine vision system.
Figure 6B:
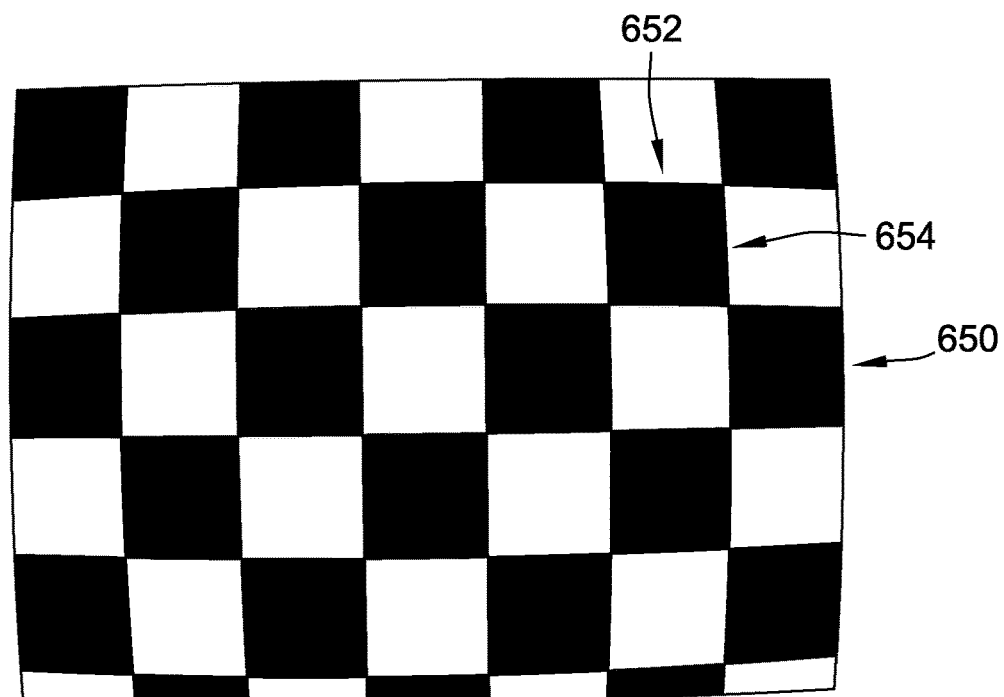
FIG. 6B is an example of an acquired image of the physical test pattern shown in FIG. 6A as acquired by the camera.

Similarly, in some examples, the at least one processor 302 is further programmed to apply simulated intrinsic sensor effects in 2-D rendered images 340. FIG. 6A is an example of a physical test pattern 600 that may be viewed by a camera used by machine vision system 362. FIG. 6B is an example of an acquired image 650 of physical test pattern 600 acquired by the camera. Physical test pattern 600 is a checkerboard pattern defined by straight horizontal lines 602 and straight vertical lines 604. However, due to intrinsic sensor effects of the camera, acquired image 650 of physical test pattern 600 is warped, such that straight horizontal lines 602 become curved horizontal lines 652 and straight vertical lines 604 become warped vertical lines 654. In an absence of further modification, 2-D rendered images 340 generated from environmental model data 308 using, for example, a ray-tracing algorithm do not include warping caused by intrinsic sensor effects such as that illustrated in acquired image 650. In certain examples, this could lead to a mismatch between native images 356 and 2-D rendered images 340 in training set 350, on the one hand, and the images machine vision system 362 sees in the field through its one or more cameras, which would potentially degrade the effectiveness of training set 350.

In the example, the at least one processor 302 is programmed to account for such intrinsic sensor effects in creating 2-D rendered images 340. In other words, the at least one processor 302 is programmed to intentionally distort a non-distorted rendered image. More specifically, the at least one processor 302 is programmed to apply simulated intrinsic sensor effects in 2-D rendered images 340. For example, the 2-D rendered images 340 are initially created from environmental model data 308 at views corresponding to the physical coordinate sets 332, e.g. using a suitable ray-tracing algorithm as discussed above, and then an intrinsic sensor effect mapping algorithm is applied to the initial output of the ray-tracing algorithm to complete 2-D rendered images 340.

For example, one such intrinsic sensor effect mapping algorithm is to map x- and y-coordinates of each initial 2-D rendered image to xd- and yd-coordinates to generate the corresponding 2-D rendered image 340 according to the formulae:

$xd = x(1 + k1r^2 + k2r^4)$; and $yd = y(1 + k1r^2 + k2r^4)$;

where r=radius to point (x, y) from a center of the initial 2-D rendered image.

Factors k1 and k2 are determined for a particular camera by, for example, comparing acquired image 650 captured by the camera to physical test pattern 600. For a camera having a fish-eye lens, a further factor k3 also may be determined and applied using a suitable extended mapping. Alternatively, the at least one processor 302 is programmed to account for such intrinsic sensor effects in creating 2-D rendered images 340 in any suitable fashion that enables training set 350 to function as described herein, or is not programmed to include intrinsic sensor effects.

Additionally or alternatively, the at least one processor 302 is programmed to apply any suitable additional processing in creating 2-D rendered images 340 and/or in processing native images 356. For example, at least some known examples of training algorithm 360 perform better on training image sets 350 having a relatively low image resolution. The at least one processor 302 may be programmed to reduce an image resolution of camera images 330 prior to storing camera images 330 as native images 356, and to create 2-D rendered images 340 having a corresponding reduced image resolution. For another example, at least some known examples of training algorithm 360 perform better on training sets 350 that do not include large swaths of unsegmented background image. The at least one processor 302 may be programmed to crop camera images 330 and/or 2-D rendered images 340 prior to storing.

Figure 7A:
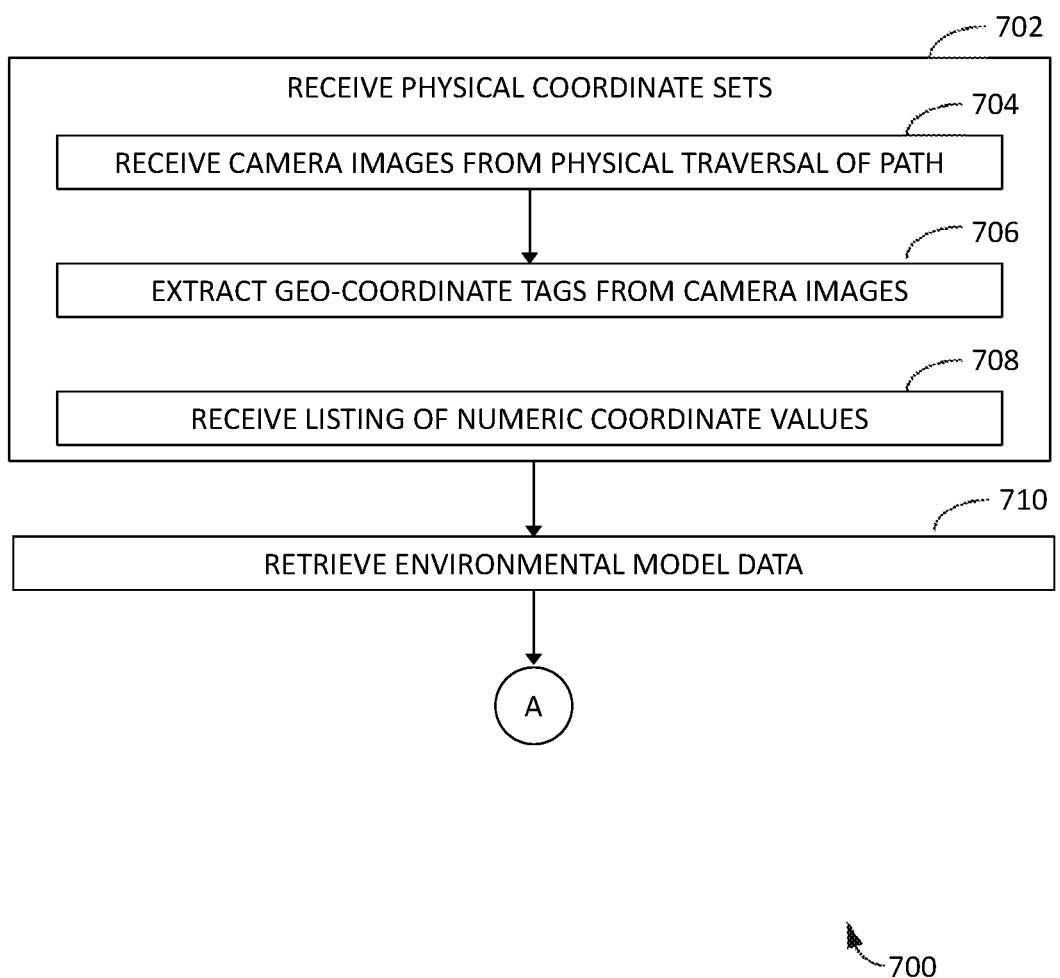
FIG. 7A is a flow diagram of an example method for generating a training set of images and labels for a native environment, such as the native environment shown in FIG. 1, using a computing system such as the one shown in FIG. 3C.
Figure 7B:
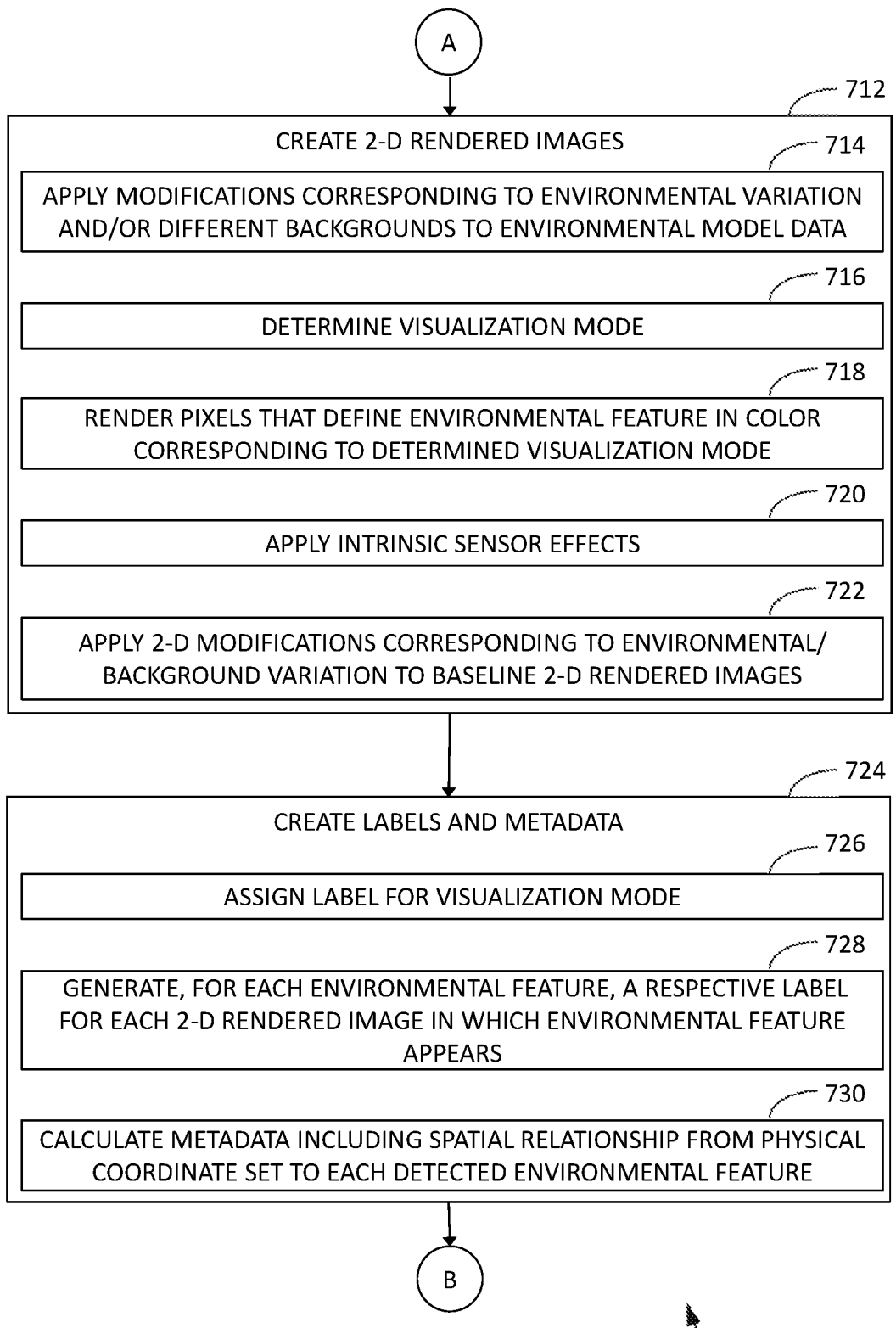
FIG. 7B is a continuation of the flow diagram of FIG. 7A.
Figure 7C:
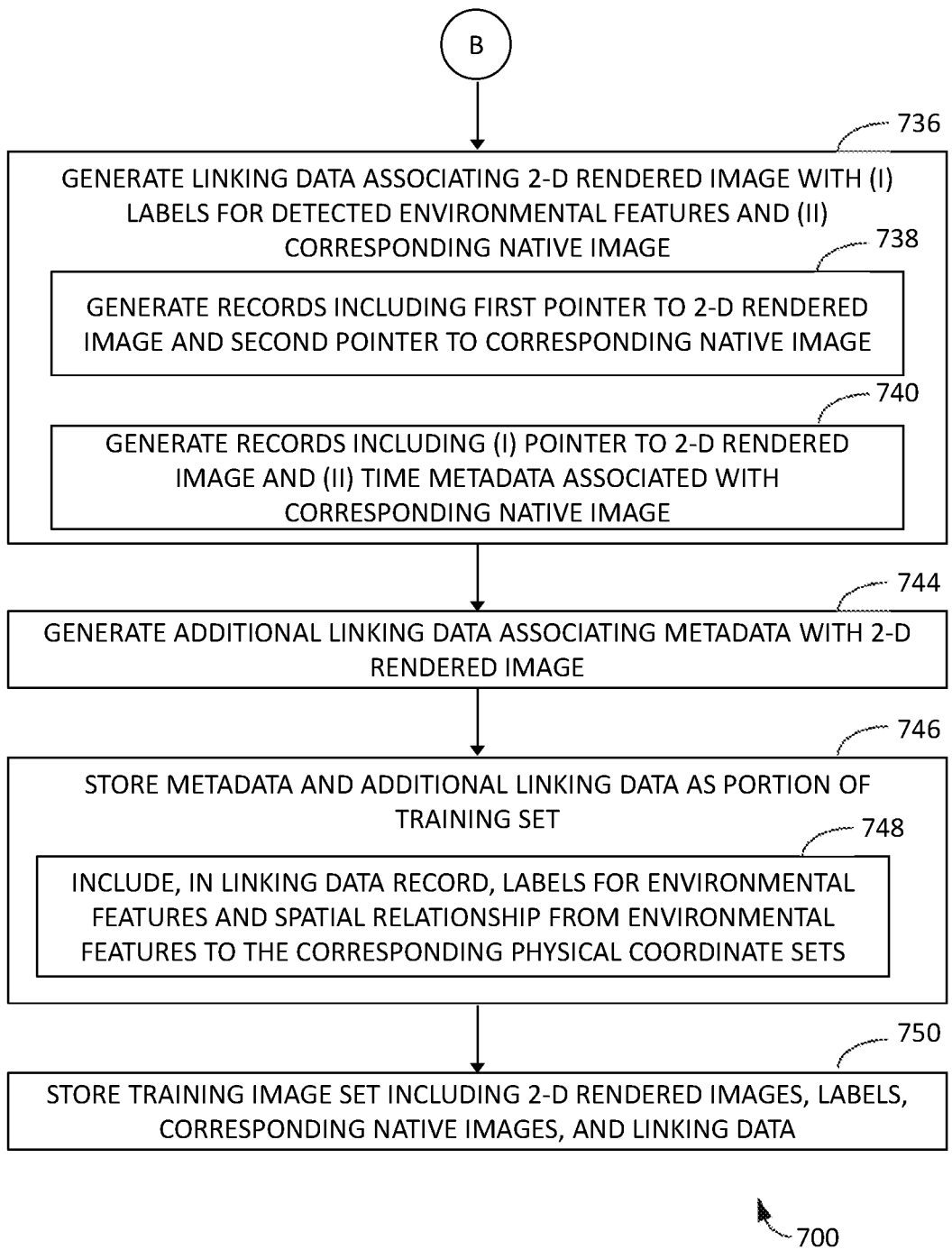
FIG. 7C is a continuation of the flow diagram of FIGS. 7A and 7B.

FIG. 7A is a flow diagram of an example method 700 for generating a training set of images and labels, such as training set 350, for a native environment, such as native environment 100. As described above, method 700 is implemented on a computing system including at least one processor in communication with at least one memory device, such as computing system 300 including at least one processor 302 in communication with at least one memory device 304. In the example, the steps of method 700 are implemented by the at least one processor 302. FIGS. 7B and 7C are continuations of the flow diagram of FIG. 7A.

With reference also to FIGS. 1-6, in the example, method 700 includes receiving 702 plurality of physical coordinate sets 332. In some examples, the step of receiving 702 physical coordinate sets 332 includes receiving 704 camera images 330 captured during a physical traversal of a path, and extracting 706 geo-coordinate tags from camera images 330 to obtain physical coordinate sets 332. In certain examples, the step of receiving 702 physical coordinate sets 332 includes receiving 708 a listing of numeric coordinate values.

In the example, method 700 also includes retrieving 710 environmental model data 308 corresponding to a georeferenced model of environment 100. Environmental model data 308 defines a plurality of environmental features 110.

In the example, method 700 further includes creating 712 2-D rendered images 340 from environmental model data 308. Each of the 2-D rendered images 340 corresponds to a view from one of physical coordinate sets 332. The plurality of 2-D rendered images 340 includes one or more of the environmental features 110. In some examples, the step of creating 712 2-D rendered images 340 includes applying 714 a plurality of modifications to environmental model data 308, each modification corresponding to a different environmental variation 502 and/or different background 504. Additionally or alternatively, the step of creating 712 2-D rendered images 340 also includes determining 716, for each of the 2-D rendered images 340, a visualization mode, and rendering 718, for each of the one or more environmental features 110, a plurality of pixels that define the environmental feature in a color corresponding to the determined visualization mode (e.g., semantic segmentation mode, RGB mode, or depth map mode). Additionally or alternatively, in certain examples, the step of creating 712 2-D rendered images 340 includes applying 720 simulated intrinsic sensor effects in 2-D rendered images 340. In some examples, as an alternative to or in addition to step 714, the step of creating 712 2-D rendered images 340 includes applying 722 2-D modifications directly to baseline 2-D rendered images 500 to create additional 2-D rendered images 340 having a plurality of simulated environmental variations 502 and/or backgrounds 504.

In some examples, method 700 also includes creating 724 at least one of labels and metadata. For example, the step of creating 724 at least one of labels and metadata includes assigning 726 visualization mode label 404 for each 2-D rendered image 340. For another example, the step of creating 724 at least one of labels and metadata includes generating 728, for each of the one or more of the environmental features 110, a respective one of the feature labels 452 for each 2-D rendered image 340 in which the environmental feature 110 appears. For another example, the step of creating 724 at least one of labels and metadata includes calculating 730, based on environmental model data 308, metadata 358 including spatial relationship metadata 454 from the corresponding physical coordinate set 332 to at least one detected environmental feature 110.

In the example, method 700 also includes generating 736 linking data 354 associating each of 2-D rendered images 340 with (i) labels for the one or more included environmental features 110 and (ii) a corresponding native image 356. In some examples, the step of generating 736 linking data 354 includes generating 738 linking data 354 as a data structure 400 that includes a plurality of records 401, and each record 401 includes first pointer 402 to at least one of the 2-D rendered images 340 and second pointer 403 to the corresponding native image 356. In certain examples, each camera image 330 is associated with timestamp 442 corresponding to a relative time 444 of traversal along the path, the step of generating 736 linking data 354 includes generating 740 linking data 354 as a data structure 400 that includes a plurality of records 401, and each record 401 includes (i) pointer 402 to at least one of the 2-D rendered images 340 and (ii) time metadata 440 comprising at least one of timestamp 442 and relative time 444 associated with the corresponding native image 356.

In certain examples, method 700 further includes, for each 2-D rendered image 340, generating 744 additional linking data 450 associating metadata 358 with the 2-D rendered image 340, and storing 746 metadata 358 and the additional linking data 450 as a portion of training set 350. In some examples, the step of storing 746 metadata 358 and the additional linking data 450 includes including 748, in at least one record 401 of data structure 400 of linking data 354, the feature label 452 for each of the one or more environmental features 110 and the spatial relationship metadata 454 from each of the one or more environmental features 110 to the corresponding physical coordinate set 332.

In the example, method 700 also includes storing 750 training set 350 including 2-D rendered images 340, labels such as visualization mode label 404 and/or feature label 452, corresponding native images 356, and linking data 354. In some examples, training set 350 is subsequently transmitted to training algorithm 360 to train machine vision system 362 to navigate environment 100.

The above described examples of computer-implemented methods and systems for generating training sets for a native environment make use of 2-D rendered images created from views of a georeferenced model of the environment. The examples include rendering pixels that define each detected environmental feature in each 2-D rendered image according to a preselected color scheme, such as a semantic segmentation, a red-green blue natural scheme, or a depth map, and generating linking data associating the 2-D rendered images with the corresponding native image. The examples further include storing the training set, including the 2-D rendered images, the native images, labels, and the linking data. In some examples, camera images captured along a path through the environment are used as the native images in the training image set, and the physical coordinate sets are extracted from the physical location and orientation of the camera at each image capture. In some examples, at least one of extrinsic sensor effects, intrinsic sensor effects, and varying background imagery is added to the 2-D rendered images to create more robust training sets.

Example technical effects of the methods, systems, and apparatus described herein include at least one of: (a) high-speed, automated generation of semantic segmentation images for training sets; (b) generation of semantic segmentation images that are objectively accurate on a pixel-by-pixel basis; (c) generation of a set of training images of an environment under a variety of environmental conditions without any need to wait for or rely on physical scene adjustments; and (d) simulation of a variety of extrinsic and/or intrinsic sensor effects in computer-generated 2-D rendered images without need for any physical camera and/or physical scene adjustments.

The systems and methods described herein are not limited to the specific examples described herein, but rather, components of the systems and/or steps of the methods may be utilized independently and separately from other components and/or steps described herein.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating a training set of images and labels for a native environment, the method implemented on a computing system comprising at least one processor in communication with at least one memory device, the method comprising using the at least one processor to:
   receive a plurality of physical coordinate sets;
   retrieve, from the at least one memory device, environmental model data corresponding to a georeferenced model of the native environment, the environmental model data defining a plurality of environmental features;
   create a plurality of two-dimensional (2-D) rendered images from the environmental model data, each of the 2-D rendered images corresponding to a view from one of the physical coordinate sets, the plurality of 2-D rendered images including one or more of the environmental features;
   calculate, for each 2-D rendered image, metadata based on the environmental model data, the metadata including a spatial relationship from the corresponding physical coordinate set to at least one of the one or more environmental features;

generate linking data associating each of the 2-D rendered images with (i) labels for the one or more included environmental features, (ii) a corresponding native image, and (iii) the metadata; and store the training set including the 2-D rendered images, the labels, the corresponding native images, the metadata, and the linking data.

2. The method according to claim 1, further comprising using the at least one processor to generate, for at least one of the environmental features, a respective one of the labels for each 2-D rendered image in which the environmental feature appears.

3. The method according to claim 1, wherein the physical coordinate sets define a path through the native environment, the method further comprising using the at least one processor to receive a plurality of camera images recorded during a physical traversal of the path, wherein each of the camera images is associated with one of the physical coordinate sets.

4. The method according to claim 3, wherein each of the camera images includes a corresponding geo-coordinate tag, and wherein the method further comprises using the at least one processor to extract the geo-coordinate tags from the camera images to receive the plurality of physical coordinate sets.

5. The method according to claim 3, wherein each of the camera images is associated with a timestamp, the timestamp corresponding to a relative time of traversal along the path, and wherein the method further comprises using the at least one processor to generate the linking data as a data structure comprising a plurality of records, each record including (i) a pointer to at least one of the 2-D rendered images and (ii) time metadata comprising at least one of the timestamp and the relative time of traversal associated with the corresponding native image.

6. The method according to claim 1, further comprising using the at least one processor to generate the linking data as a data structure comprising a plurality of records, each record including a first pointer to at least one of the 2-D rendered images and a second pointer to the corresponding native image.

7. The method according to claim 1, wherein the linking data comprises a data structure comprising a plurality of records, each record including a first pointer to at least one of the 2-D rendered images and a second pointer to the corresponding native image, and wherein the method further comprises using the at least one processor to store the metadata and the linking data by including, in at least one of the records, the label for each of the one or more environmental features and the spatial relationship from each of the one or more environmental features to the corresponding physical coordinate set.

8. The method according to claim 1, wherein using the at least one processor to create the plurality of 2-D rendered images comprises:

determining, for each of the 2-D rendered images, a visualization mode; and rendering, for each of the one or more environmental features, a plurality of pixels that define the environmental feature in a color corresponding to the determined visualization mode.

9. The method according to claim 1, wherein using the at least one processor to create the plurality of 2-D rendered images comprises applying simulated intrinsic sensor effects.

10. A computing system for generating a training set of images and labels for a native environment, the computing system comprising at least one processor in communication with at least one memory device, wherein the at least one processor is configured to:

receive a plurality of physical coordinate sets;

retrieve, from the at least one memory device, environmental model data corresponding to a georeferenced model of the native environment, the environmental model data defining a plurality of environmental features, wherein the environmental model data links an internal coordinate system of the georeferenced model to a system of geographic coordinates;

create a plurality of two-dimensional (2-D) rendered images from the environmental model data, each of the 2-D rendered images corresponding to a view from one of the physical coordinate sets, the plurality of 2-D rendered images including one or more of the environmental features;

generate linking data associating each of the 2-D rendered images with (i) labels for the one or more included environmental features, and (ii) a corresponding native image; and store the training set including the 2-D rendered images, the labels, the corresponding native images, and the linking data.

11. The computing system according to claim 10, wherein the at least one processor is further configured to generate, for at least one of the environmental features, a respective one of the labels for each 2-D rendered image in which the environmental feature appears.

12. The computing system according to claim 10, wherein the physical coordinate sets define a path through the native environment, and wherein the at least one processor is further configured to receive a plurality of camera images recorded during a physical traversal of the path, wherein each of the camera images is associated with one of the physical coordinate sets.

13. The computing system according to claim 12, wherein each of the camera images includes a corresponding geo-coordinate tag, and wherein the at least one processor is further configured to receive the plurality of physical coordinate sets by extracting the geo-coordinate tags from the camera images.

14. The computing system according to claim 12, wherein each of the camera images is associated with a timestamp, the timestamp corresponding to a relative time of traversal along the path, and wherein the at least one processor is further configured to generate the linking data as a data structure comprising a plurality of records, each record including (i) a pointer to at least one of the 2-D rendered images, and (ii) time metadata comprising at least one of the timestamp and the relative time of traversal associated with the corresponding native image.

15. The computing system according to claim 10, wherein the at least one processor is further configured to generate the linking data as a data structure comprising a plurality of records, each record including a first pointer to at least one of the 2-D rendered images and a second pointer to the corresponding native image.

16. The computing system according to claim 10, wherein the at least one processor is further configured to, for each 2-D rendered image:

calculate, based on the environmental model data, metadata including a spatial relationship from the physical coordinate set to at least one of the one or more environmental features;

generate additional linking data associating the metadata with the 2-D rendered image; and store, in the at least one memory device, the metadata and the additional linking data as a portion of the training set.

17. The computing system according to claim 10, wherein the linking data comprises a data structure comprising a plurality of records, each record including a pointer to at least one of the 2-D rendered images and a pointer to the corresponding native image, and wherein the at least one processor is further configured to store the metadata and the additional linking data by including, in at least one of the records, the label for each of the one or more environmental features and the spatial relationship from each of the one or more environmental features to the corresponding physical coordinate set.

18. The computing system according to claim 10, wherein the at least one processor is further configured to create the plurality of 2-D rendered images by:

determining, for each of the 2-D rendered images, a visualization mode; and rendering, for each of the one or more environmental features, a plurality of pixels that define the environmental feature in a color corresponding to the determined visualization mode.

19. A non-transitory computer-readable storage medium having computer-executable instructions embodied thereon for generating a training set of images and labels for a native environment, wherein when executed by at least one processor in communication with at least one memory device, the computer-executable instructions cause the at least one processor to:

receive a plurality of physical coordinate sets;

retrieve, from the at least one memory device, environmental model data corresponding to a georeferenced model of the native environment, the environmental model data defining a plurality of environmental features;

create a plurality of two-dimensional (2-D) rendered images from the environmental model data, each of the 2-D rendered images corresponding to a view from one of the physical coordinate sets, the plurality of 2-D rendered images including one or more of the environmental features;

calculate, for each 2-D rendered image, metadata based on the environmental model data, the metadata including a spatial relationship from the physical coordinate set to at least one of the one or more environmental features;

generate linking data associating each of the 2-D rendered images with (i) labels for the one or more included environmental features, (ii) a corresponding native image, and (iii) the metadata; and store the training set including the 2-D rendered images, the labels, the corresponding native images, the metadata, and the linking data.

20. The non-transitory computer-readable storage medium of claim 19, wherein:

the linking data comprises a data structure comprising a plurality of records, each record including a pointer to at least one of the 2-D rendered images and a pointer to the corresponding native image, and the computer-executable instructions further cause the at least one processor to store the metadata and the linking data by including, in at least one of the records, the label for each of the one or more environmental features and the spatial relationship from each of the one or more environmental features to the corresponding physical coordinate set.

* * * * *